(12) United States Patent
Roth

(10) Patent No.: US 6,926,961 B2
(45) Date of Patent: Aug. 9, 2005

(54) NONWOVEN BLEND WITH ELECTRET FIBER

(75) Inventor: Douglas Duane Roth, Kannapolis, NC (US)

(73) Assignee: Invista North America S.a.r.l., Charlotte, NC (US)

(*) Notice: Subject to any disclaimer, the term of this patent is extended or adjusted under 35 U.S.C. 154(b) by 0 days.

(21) Appl. No.: 09/930,515

(22) Filed: Aug. 15, 2001

(65) Prior Publication Data
US 2003/0039815 A1 Feb. 27, 2003

(51) Int. Cl.$^7$ .................................................. D02G 3/00
(52) U.S. Cl. .................. 428/364; 428/373; 55/527; 55/DIG. 39; 252/62.54; 442/415; 361/225
(58) Field of Search ........................ 428/364, 373, 428/378, 357, 402; 55/DIG. 39, DIG. 35, 527; 361/225; 252/62.54, 500; 442/415, 356, 402, 333

(56) References Cited

U.S. PATENT DOCUMENTS

| | | | |
|---|---|---|---|
| 4,874,399 A | | 10/1989 | Reed et al. .................... 55/2 |
| 5,401,446 A | * | 3/1995 | Tsai et al. ..................... 264/22 |
| 5,558,809 A | * | 9/1996 | Groh et al. ............... 252/62.54 |
| 5,726,107 A | | 3/1998 | Dahringer ................... 442/414 |
| 5,871,845 A | * | 2/1999 | Dahringer et al. .......... 428/378 |

* cited by examiner

Primary Examiner—Merrick Dixon
(74) Attorney, Agent, or Firm—Gregory N. Clements

(57) ABSTRACT

The present invention relates to a blend of 15–97 weight percent electret fibers and 3–85 percent by weight dissimilar non-electret fibers using dry laid blending technique. The electret fibers incorporate 0.05 to 30 weight percent charge control agents. Optionally, at least about 3 to about 50 weight percent of said blend is bicomponent fibers having a low melting component to bond the blend into a unitary nonwoven structure. The blend is bonded to form nonwoven webs that are used in making filter fabric and particularly air filter fabric. The charge control agents are selected from the class of triphenylmethanes; ammonium and immonium compounds; fluorinated ammonium and immonium compounds; bis-cationic acid amides; polymeric ammonium compounds; diallylammonium compounds; arylsulfide derivatives; phenol derivatives; phosphonium compounds and fluorinated phosphonium compounds; calix(n)arenes; metal complex compounds; benzimidazolones; and azines, thiazines or oxazines which are listed in the Color Index as Pigments, Solvent Dyes, Basic Dyes or Acid Dyes. The preferred blend contains electret fibers of polypropylene with one or more charge control agents and polyethylene terephthalate fibers having no charge control agents.

16 Claims, 2 Drawing Sheets

NONWOVEN BLEND WITH ELECTRET FIBER

BACKGROUND OF THE INVENTION

1) Field of the Invention

The present invention relates to a blend of electret fibers and dissimilar non-electret fibers useful for making nonwoven webs. The nonwoven webs are used in making filter fabric and particularly air filter fabric. In particular, the present invention relates to a blend of electret based fibers having one or more charge control agents (CCA) with dissimilar fibers having no CCA. More specifically, the present invention concerns a nonwoven web useful in air filters comprising fibers of polypropylene with one or more charge control agents and polyethylene terephthalate fibers having no CCA.

2) Prior Art

Use of polypropylene electret fibers for filter fabric has been known since the Naval Research Laboratories published Report No. 4364 on May 25, 1954, entitled "Manufacturer of Superfine Organic Fibers" by Van Wente et al. Since that time, many patents have issued on electret fibers and other filter media fabric.

Two types of charges are responsible for the electric fields within the fabric, namely: polarization charges and free (or coulomb) charges. Polarization charges result from the displacement of positive and negative charges within the fiber, e.g., preferential orientation of dipolar bonds. An example of polarization charges is the charge resulting from solidification of the molten fiber in the presence of a strong electric field. The charge polarization produces dipole fields that may be relatively strong at the fiber surface, but decrease rapidly with increased distance from the fiber surface.

Free or coulomb charges generate longer-range forces due to an excess or deficiency of electrons over a substantial length of fiber. These coulomb fields are typically better dust collectors than polarization fields. It is possible to generate "islands" of isolated charges at various locations within the fabric. Additives to the polymer may improve coulomb charge storage in a fiber. These additives are generally known as charge control agents (CCA).

Triboelectric charging generates free charges on the fiber, and results whenever two dissimilar materials are brought into contact, then separated. The amount of charge transfer, and the direction of the electron transfer both depend on the material, their temperature, humidity, etc. Triboelectric charging offers the possibility of a continual source of charge imbalance in fibers, e.g., by mixing fiber materials that have a strong natural tendency to transfer charges to each other. In order for the charge separation to produce useful electric fields, it is important that at least one of the members be a sufficiently good insulator to maintain its charged state for the required period of time (several months to several years).

Knowing the material to be filtered is important in determining the effectiveness of the filter web. For example, common house dust composed of human skin, hair and fur from animals is usually positive in charge. Accordingly, having a filter with areas of negative charge will enhance the filtration of these particles in that opposite charges attract one another. Conversely, if rubber dust is being separated, it generally possesses a negative charge and having areas in the filter that are positively charged is desirable. It is not necessary for the filtered particles to possess any free charge in order for an electret filter to attract them. If the particles can be polarized by the electric field around the fiber, the charge imbalance can generate an attraction. The stronger the electric field, the more effective is the filtration.

U.S. Pat. No. 5,726,107 to Dahringer et al. discloses fabrics made of polymer electret fibers having 0.01 to 30% by weight of at least one charge control agent. This patent lists many classes of CCA compatible with polyolefin polymers.

Blends of electret fibers with non-electret fibers are known and disclosed in U.S. Pat. No. 5,871,845 to Dahringer et al. Column 14, lines 9–50 state that electret yarns can be present as mixed yarns with other synthetic fibers or natural fibers. However, as explained below, the examples of this patent use similar fibers for both the electret and non-electret fibers.

U.S. patent '845 is specifically directed to polyethylene terephthalate (PET) electret fibers (e-PET) using the same CCA as the present invention. It discloses the use of these e-PET fibers with regular PET fibers. In all examples, 20 percent bicomponent (copolyester/polyester) was employed. In Table 1, Sample 1 was e-PET. Sample 2 was a 50/50 blend of e-PET and PET. Sample 3 was PET alone. The degree of separation T(x) was measured to show the filtration efficiency. From this data it is clear that a 50/50 blend (Sample 2) has a T(x) value midway between e-PET and PET. This indicates that the rule of mixtures holds.

TABLE 1

| | T(x) | | |
|---|---|---|---|
| Particle Size | Sample 1 e-PET | Sample 2 e-PET/PET | Sample 3 PET |
| 0.3 | 0.81 | 0.71 | 0.62 |
| 0.5 | 0.85 | 0.77 | 0.70 |
| 1.0 | 0.89 | 0.82 | 0.77 |

While the above fibers were formed by melt spinning, it is also known to form the fibers by melt blowing.

Lastly, several methods are known to charge electret fibers such as corona charging, triboelectric charging and inductive charging. These methods provide differing relative amounts of free charge and polarization charge.

U.S. Pat. No. 4,874,399 to Reed et al. discloses a melt blown blend of electret fibers comprising poly (4-methyl-1-pentene) and other polyolefin fibers that can accept a filtration-enhancing electrostatic charge and sustain that electret filtration enhancement in the presence of oily aerosols.

U.S. Pat. No. 5,401,466 to Tsai et al. discloses a charging process in which a web containing electrostatic fibers traverses through an electrostatic field and the fibers accept and sustain a filtration enhancing electrostatic charge. Then the web traverses through another charging field where the polarity of the field is reversed. This is called the Tantret™ process.

U.S. Pat. No. 5,558,809 to Groh et al. discloses the use of additives to produce polymer electrets. In particular, this reference discloses the use of a polymer electret, CCA, and an arylsulfide compound and an azochromium complex. Additionally, Groh et al. teach that electret fibers can be charged using a corona or triboelectric process.

To determine filter efficiency, the properties of the polymer, the structure of the filter media, and the determination of the electrostatic charge effectiveness are important considerations. Among these, electrical conductivity is believed to be the most important in affecting the performance of the charged fibers. Subsequently, there is a continual need for improving electret fibers by improving the electrostatic charge effectiveness and particularly by increasing the electrical resistivity of the electret fibers.

SUMMARY OF THE INVENTION

The present invention relates to a blend of 15–97 weight percent electret fibers and 3–85 percent by weight dissimilar non-electret fibers using dry laid blending techniques. The electret fibers incorporate 0.05 to 30 weight percent CCA. Optionally, at least about 3 percent by weight of the fiber blend is bicomponent fibers having a low melting point component to bond the blend into a unitary nonwoven structure.

In the broadest sense, the present invention comprises a blend of 15–97 weight percent electret fibers, and 3–85 percent by weight dissimilar non-electret fibers, said electret fibers having 0.05 to 30 weight percent CCA.

DESCRIPTION OF THE PREFERRED EMBODIMENTS

Figure 1:
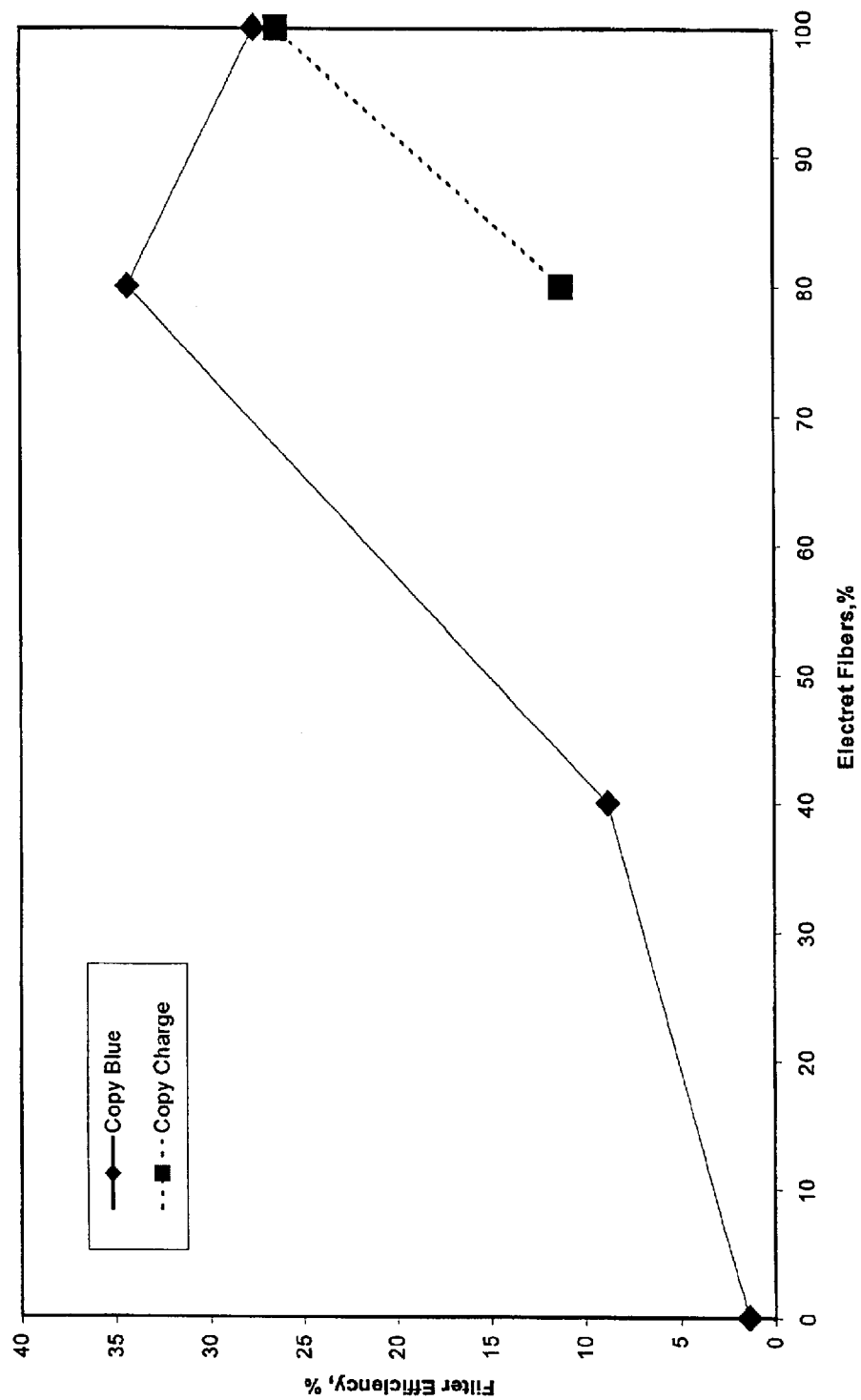
FIG. 1 is a graph of filter efficiency versus percent electret fibers for uncharged webs.

Suitable CCA of the present invention are selected from the class of CCA set forth in U.S. Pat. No. 5,726,107 to Dahringer et al. and the specification of this application is hereby incorporated into this specification in its entirety. These CCA are chosen from the group consisting of triphenylmethanes; ammonium and immonium compounds; fluorinated ammonium and immonium compounds; bis-cationic acid amides; polymeric ammonium compounds; diallylammonium compounds; arylsulfide derivatives; phenol derivatives; phosphonium compounds and fluorinated phosphonium compounds; calix(n)arenes; metal complex compounds; benzimidazolones; and azines, thiazines or oxazines which are listed in the Color Index as Pigments, Solvent Dyes, Basic Dyes or Acid Dyes. Additionally, suitable CCA of the present invention can be those sold under the brand names 'Copy Charge' or 'Copy Blue' from Clariant Corporation.

It has been determined that the COPY BLUE PR enhances the negative charge capability of the electret, while the COPY CHARGE NY VP 2351 enhances the positive charge capability of the electret. Utilizing either of these CCA makes a polymer "more negative" or "more positive" within the triboelectric scale. The triboelectric scale is a list set forth from *Nature's Electricity* page 63, by Charles K. Adams, Copyright 1987 hereby incorporated into the specification in its entirety.

The amount of CCA incorporated into the electret is in a range from about 0.05 to 30% by weight based on the weight of the electret fibers. More preferably, the amount of CCA ranges from about 0.1 to about 5% by weight based on the weight of the electret fibers, and most preferably, from about 0.1 to 1.0% by weight based on the weight of the electret fiber. The CCA can simply be blended with the molten polymer selected for the electret fibers, just prior to extrusion.

Suitable polymers for the electret fiber are polytetrafluoroethylene (Teflon), polyolefin, polyurethane, polyester, polycarbonate, or a mixture of two or more of these. Suitable polyolefins of the present invention are polyethylene, polypropylene, and polybutylene, or mixtures of these. The preferred polyolefin is polypropylene. Suitable polyesters of the present invention are polyethylene terephthalate (PET), polypropylene terephthalate, polybutylene terephthalate, polyethylene naphthalate, polyethylene bibenzoate, or mixtures of two or more of these. The preferred polyester is PET.

The electret fiber may be made from homopolymer or copolymer, or a heterofilament, which is a bicomponent where one component is an electret. Thus the heterofilament may be employed as an inexpensive way to make an electret. For example, the sheath may be CCA filled and the core may be any inexpensive filler material (it is known from the '845 patent that CCA is less effective the further it is from the particles to be filtered, so CCA not on the surface of the fiber may be of diminished value).

The dissimilar non-electret fiber may be any common synthetic fiber so long as it is not the same polymer (preferably not even the same class of polymer) as the electret synthetic fiber polymer. Suitable dissimilar non-electret fibers that can be employed are polyolefin, polyacrylates, polyacrylonitrile, polystyrene, fluoropolymers, polytetrafluoroethylene (otherwise known as Teflon), polyesters, such as polyethylene terephthalate, copolyesters, polyurethane, polycarbonates, polyamides, polyimides, polyetherketones, polyacetals, or a mixture of two or more of these. Therefore the dissimilar fiber could be homopolymer, or copolymer.

The electret fibers and the dissimilar non-electret fibers may be blended together by any dry laid processes known to those skilled in the art, such as air laying, carding, garneting, or random carding. By convention in the art, small letter 'e' before a polymer means that the polymer is the electret polymer or fiber. Suitable blends are e—polypropylene/polyester; e—polyester/nylon; e—polyurethane/polyacrylates, to name just a few. Other suitable blends can comprise mixtures of electret fibers and/or mixtures of dissimilar fibers.

The filter web can be bonded by mechanical, chemical or thermal processes. Mechanical bonding uses entanglements introduced by needle punching or hydroentangling. Chemical bonding uses adhesives such as latex resins, or hot melt adhesives. Thermal bonding utilizes low melt point fibers melted in an oven (hot air, radiant or microwave), on heated calender roll(s), or by ultrasonic energy.

The preferred binder systems of the present invention are conventional latex systems, hot melt adhesives, or thermal bonding fibers, or a mixture of these. Conventional latex systems such as styrene-butadiene copolymer, acrylate, and polyvinyl acetate systems, as well as mixtures of these are well known. When a conventional latex system is employed with the present invention, the amount of binder may range from 5–60% by weight of the web. Hot melt adhesives are generally solid powder materials, non-latex paste, and/or liquid compositions well known to those in the art. Thermal bonding comprises conventional low melt fibers, bicomponent fibers, or a mixture of these, which are melted as stated previously, and cooled to solidify the melt, thus bonding the blend of fibers. Conventional low melt fibers can be polyolefins, for example, and in particular linear low-density polyethylene.

Bicomponent fibers can be of the type in which the low melting point portion is adjacent to the high melting point portion such as a side-by-side configuration, or in a sheath-core configuration wherein the sheath is the lower melting component and the core is the higher melting component. It is contemplated that the web of the present invention will comprise between 3 and 50% by weight thermal bonding fiber, such as bicomponent bonding fiber. This optimum amount of thermal bonding fiber is deemed to be adequate to bond the web into a unitary structure.

Suitable bicomponent fibers have a denier of between about 0.5–18 and can comprise polyethylene/polypropylene; polyethylene/polyester (especially polyethylene terephthalate); polypropylene/polyester; copolyester/polyethylene terephthalate, such as polyethylene terephthalate-isophthalate/polyethylene terephthalate; nylon 6/nylon 6,6; and nylon 6/polyethylene terephthalate. Preferably polyethylene/polyester bicomponent fibers are used, especially grafted polyethylene/polyethylene terephthalate, such as linear low-density polyethylene/polyethylene terephthalate. Bicomponent fibers having a denier of between 2 and 6 are the preferred thermal bonding fiber.

Optionally, the electret heterofilament can serve as the binder fiber. The heterofilament could consist of a low melting point component and an electret high melting point component. Alternatively, the low melting component of the heterofilament could function as the electret.

Those skilled in the art realize that that the present invention may be a two component blend or a three component blend. For example, a blend of electrets and dissimilar fibers that are mechanically bonded is a typical two component blend. Another two component blend is when the electret fiber is a heterofilament that also serves as a binder. A typical three component blend comprises electret fiber, dissimilar fiber, and bicomponent fibers as binder. The three component blend is the preferred embodiment.

In the preferred embodiment, once the electret fibers, dissimilar non-electret fibers and bicomponent binder fibers have been selected, these fibers can be typically blended by any dry laid processes, such as air laid, carding, garneting, or random carding processes conventionally known to those skilled in the art. Subsequent to dry laying, the fibers are heated, thereby melting the low melt component of the bicomponent fibers causing it to run to the intersection of fibers. The fibers are then permitted to cool and the low melting component solidifies, forming a unified filter web. Suitable filter webs have weights in the range of 50 to about 500 grams per square meter, depending upon its use. Typically, the filter web comprises from about 50 to about 100 grams per square meter.

Preferably the electret fibers of the present invention are charged. However, even if no physical charging takes place, triboelectric effects occur and the CCA possesses the ability to attract oppositely charged particles, thus improving the filter efficiency. Introducing the electret fibers (before dry laying/blending, after dry laying/blending, or after bonding into a filter web) to a corona treatment or preferably a Tantret™ process charges the CCA.

The preferred fiber blend of the present invention consists of: polypropylene electret fibers having between 0.1 and 1.0 percent by weight charge control agent; dissimilar non-electret polyester fibers; and bicomponent binder fibers comprising a low melting component and a PET component.

TESTING PROCEDURE

The filter efficiency was measured, both with and without being charged, using a TSI Model 8130 using sodium chloride having a particle size of 0.1 microns and a base velocity of 5.3 centimeters per second.

The denier per filament (dpf) was determined by weighing (in grams) 9000 meters of a filament.

THE EXAMPLE

Six filter webs were made with different fiber blends as well as with different CCA. The fibers were blended, carded, and cross-lapped. In Samples 4 and 6, the fibers were bonded by needle punching. In all other Samples the webs were bonded by the bicomponent fibers. The webs were approximately 85 grams per square meter.

The electret fibers were polypropylene having a dpf of 2.2. The electret fibers of Samples 2–4 contained 0.3 weight % Copy Blue PR, while Samples 5 and 6 contained 0.15 weight % Copy Charge NY VP 2351. The non-electret fibers were PET fibers having a 3 dpf and were about 1.5 inches long. The bicomponent fibers were 35/65 wt. % copolyester/PET sheath-core type about 2 inches long, and comprised about 20% by weight of the filter web when employed. The filter efficiency was measured without charging, and then the fiber was charged and the filter efficiency was measured again. The filter webs were charged by the Tantret™ process. The results are set forth in Table 2 below and graphically shown in FIGS. 1 and 2.

TABLE 2

FILTER EFFICIENCY RESULTS

| Sample | % Electret Fiber (e-PP) | CCA Type | Filter Efficiency (No Charging) | Filter Efficiency (After Charging) |
|---|---|---|---|---|
| 1 | 0 | | 1.4 | 3.5 |
| 2 | 40 | Copy Blue | 8.8 | 39.4 |
| 3 | 80 | Copy Blue | 34.3 | 62.4 |
| 4 | 100 | Copy Blue | 27.6 | 51.8 |
| 5 | 80 | Copy Charge | 11.2 | 37.3 |
| 6 | 100 | Copy Charge | 26.4 | 59.8 |

Figure 2:
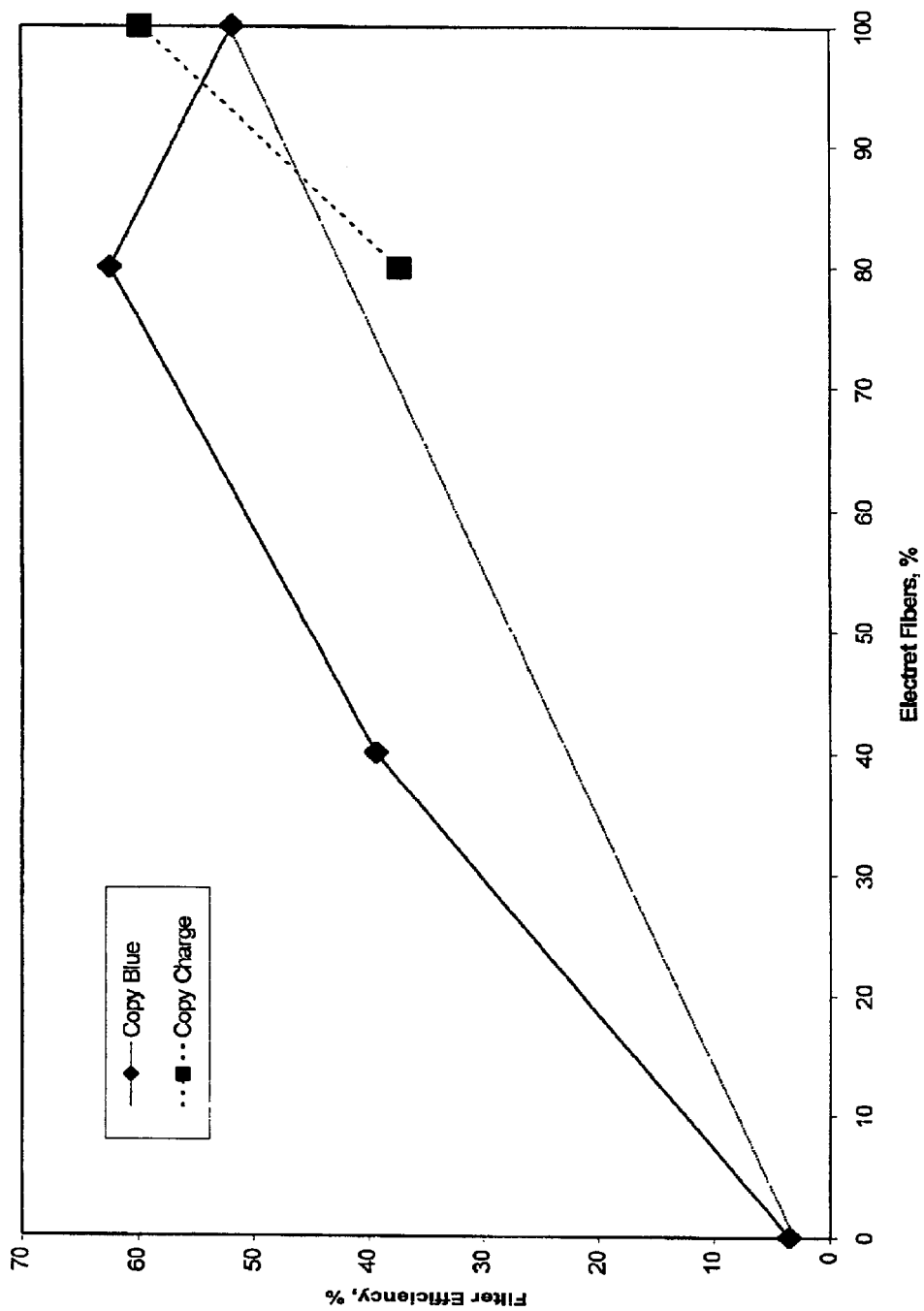
FIG. 2 is a graph of filter efficiency versus percent electret fibers for charged webs.

The filter efficiency of samples containing an electret fiber is greatly increased by the charging process due to the creation of very positive charges in some areas of the web and relatively negative charges in other areas. In the case of blends of electret fibers containing charge control agents and non-electret fibers, there is superimposed on this pattern a triboelectric effect. In this example, the electret fibers are polypropylene with CCA and the non-electret fibers are polyester. Polypropylene is more negative in triboelectric effect relative to polyester. Therefore the Copy Blue additive, which enhances the negative charge capability of the electret fibers, increases the triboelectric difference of the two materials, and increases the triboelectric charging. As noted in the table there is a surprising result when the amount of electret fiber is about 80 percent by weight of the blend, both with no charging and after charging. This filter efficiency is greater than using 100 percent electret fiber. Surprisingly, FIG. 2 shows that blend levels of 15–97% of electrets are better than the rule of mixtures as predicted by the prior art. The rule of mixtures for charged Copy Blue is the dotted line extending between 0 and 100% electret fibers. For example, when using 50% electret fibers, the rule of mixture would predict a filter efficiency of about 25%, while the present invention yields a result of about 45%.

On the other hand, when using Copy Charge, which enhances the positive charge capability of the electret, filter efficiency of the blends is still improved (compared with no electrets—Sample 1) but not as great as when using the Copy Blue. The triboelectric difference between the two materials is reduced, which decreases the triboelectric charging effect. This results in a reduction in filter efficiency, which can be seen in FIGS. 1 and 2.

Thus, it is apparent that there has been provided, in accordance with the invention, an improved filter web and a blend of electret and dissimilar non-electret fibers, that fully satisfy the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the invention.

What is claimed is:

1. A fiber blend for filter media use, comprising: a blend of electret synthetic fibers and dissimilar non-electret synthetic fibers, said electret synthetic fibers present from about 25 to about 97 weight % of said blend, and said dissimilar non-electret synthetic fibers present from about 3 to about 75 weight % of said blend, and said electret synthetic fibers having from about 0.1 to about 30 weight % of charge control agent, based on said weight of said electret synthetic fibers.

2. The fiber blend of claim 1, wherein said blend is bonded by a mechanical process, a chemical process, or with binder fibers.

3. The fiber blend of claim 2, wherein said mechanical process is by needle punching or hydroentangling.

4. The fiber blend of claim 2, wherein said chemical process is by latex resin bonding or hot melt adhesives bonding.

5. The fiber blend of claim 2, wherein said binder fibers employs low melt polymer fibers or bicomponent fibers.

6. The fiber blend of claim 5, wherein said binder fibers are said bicomponent fibers and comprises from about 3 to about 20 weight % of said blend.

7. The fiber blend of claim 6, wherein said bicomponent fibers have a low melting point component and a high melting point electret fiber component.

8. The fiber blend of claim 6, wherein said bicomponent fibers have a low melting point component and a high melting point dissimilar non-electret fiber component.

9. The fiber blend of claim 1, wherein said electret synthetic fibers are selected from the class of polytetrafluoroethylene (Teflon), polyolefin, polyurethane, polyester, or a mixture of two or more of these.

10. The fiber blend of claim 1, wherein said non-electret fibers are selected from the class of polyolefin, polyacrylates, polyacrylonitrile, polystyrene, fluoropolymers, polyesters, polyurethane, polycarbonates, polyamides, polyimides, polyetherketones, polyacetals, or a mixture of two or more of these.

11. The fiber blend of claim 1, wherein said charge control agent is selected from the class of triphenylmethanes.

12. The fiber blend of claim 11, wherein said charge control agent is Copy Blue.

13. The fiber blend of claim 11, wherein said charge control agent is Copy Charge.

14. The fiber blend of claim 1, wherein said electret synthetic fibers are polypropylene fibers.

15. The fiber blend of claim 14, wherein said non-electret synthetic fibers are polyethylene terephthalate fibers.

16. The fiber blend of claim 15, wherein said charge control agent is Copy Blue or Copy Charge.

* * * * *